Dec. 24, 1935.  J. G. HUYE  2,025,589
BOX
Filed Aug. 30, 1934   2 Sheets-Sheet 1
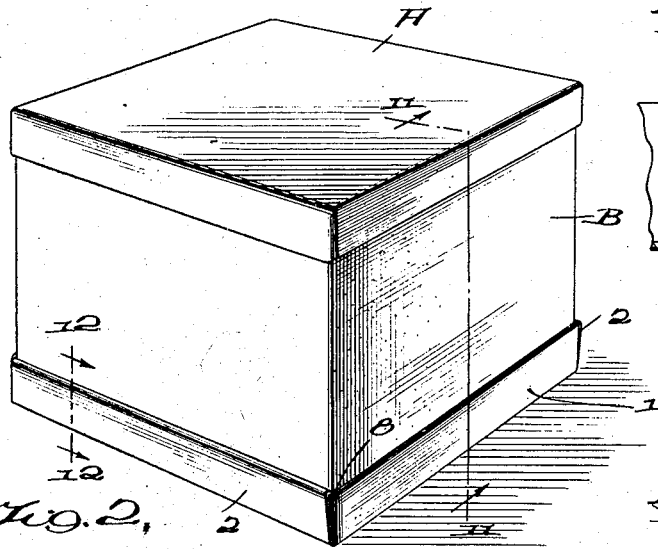
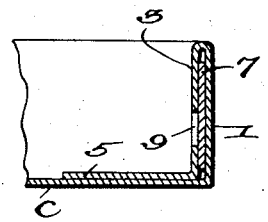
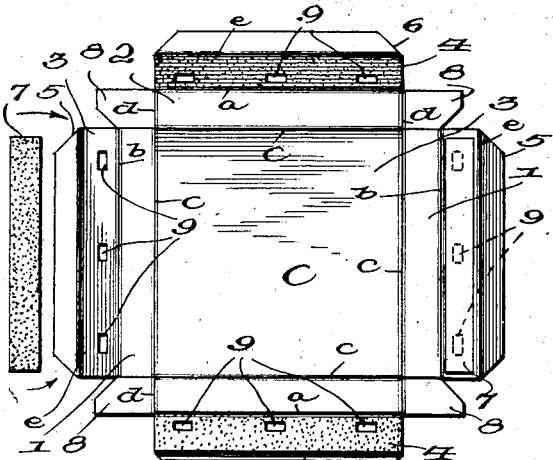
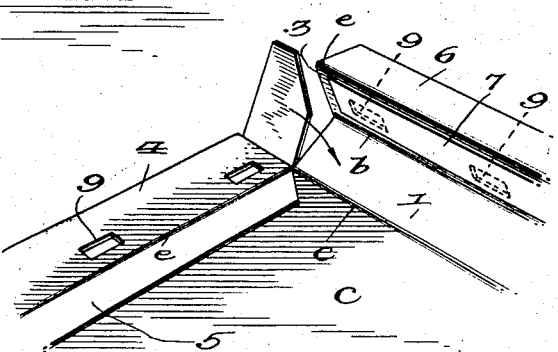
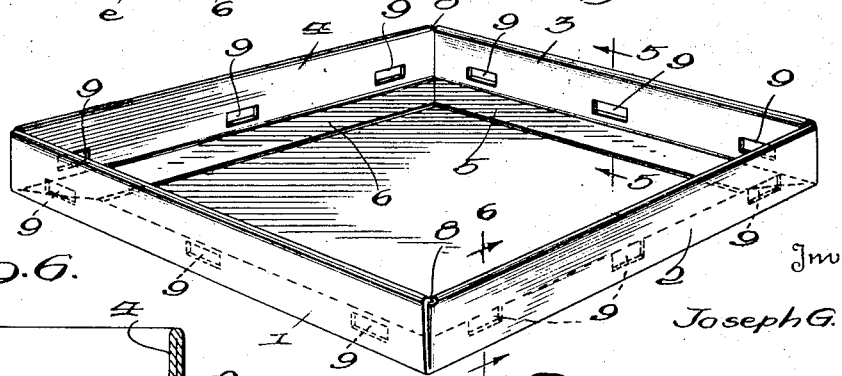
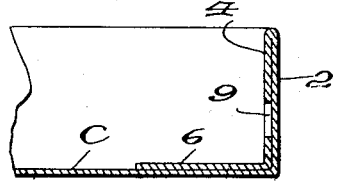
Inventor
Joseph G. Huye,
By Richard E. Babcock
Attorney Dec. 24, 1935. J. G. HUYE 2,025,589
BOX
Filed Aug. 30, 1934 2 Sheets-Sheet 2
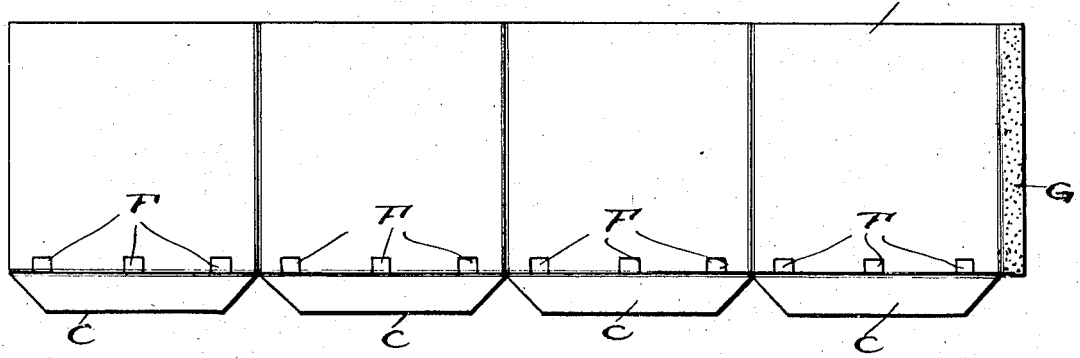
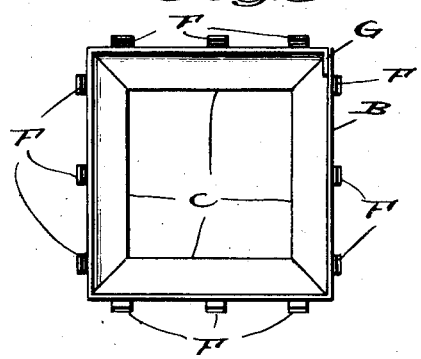
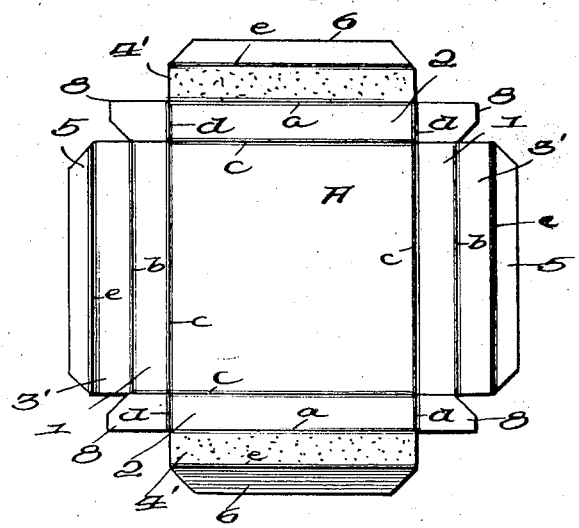
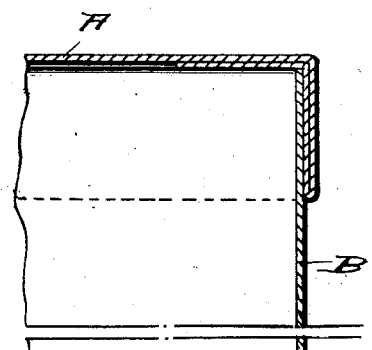
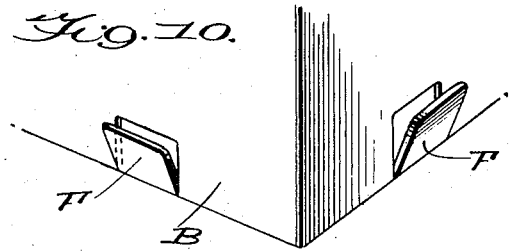
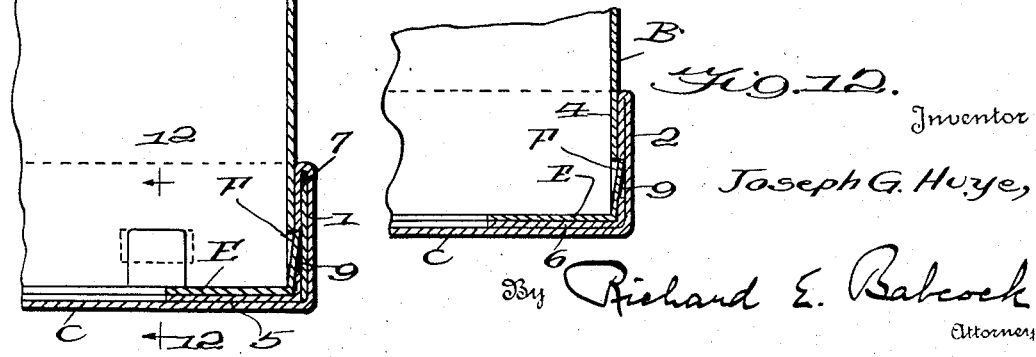
Inventor
Joseph G. Huye,
By Richard E. Babcock
Attorney Patented Dec. 24, 1935

2,025,589

UNITED STATES PATENT OFFICE 2,025,589

BOX

Joseph G. Huye, New Orleans, La.

Application August 30, 1934, Serial No. 742,168

1 Claim. (Cl. 229—23)

This invention relates to knock-down set-up boxes of the type shown in my Patents No. 1,641,974 granted Sept. 13, 1927 and No. 1,683,192 granted Sept. 4, 1928, and is an improvement on the inventions set forth in said patents.

The box of the present invention is intended for the same general field of use as outlined in the said patents and comprises a top section A, a body portion B having a bracing and spreading flange E and formed with locking tongues F, and a bottom section C having sockets in its lip receiving said locking tongues, said parts or sections in general being constructed and related, and having the same functions, all as set forth in the above referred to patents.

The present invention has for its primary objects to provide a stronger and more rigid box; to provide a stronger and more rigid interlocked bottom portion of the box; to reinforce and strengthen the lip of the bottom section and to cause it to hug the lower end of the body section more snugly; to brace the bottom as a whole as well as the lip to aid in maintaining such snug fit; to provide a construction of the top and bottom sections whereby they may be knocked down perfectly flat, including the lip, for storing, filing and shipping and may be quickly and easily erected into locked assembled condition for use with the body section; to provide a top and bottom section construction eliminating the use of all external stitching, pasting or other attaching or connecting means whereby said sections may be quickly erected from a flat condition into a permanently locked rigid assembled condition simply by the use of the operator's hands and without the use of any stitching, stapling, or adhesive applying or other instrument and without any exterior stitching, stapling, or paste or pasting strip marring the decorated finish of the box; and to provide such a knock-down set-up bottom section construction which will so combine with the body section that the upper ends of the latter will interengage and lock with opposed surfaces of the lip of the bottom section all substantially in the same plane transversely of, and perpendicular to, the body.

In the accompanying drawings:

Figure 1 represents a perspective view of a box embodying my invention;

Figure 2, a top plan view of the bottom section blank in partially finished condition before the panels 4 have been pasted or glued to the panels 2 and before one of the backing strips 7 has been pasted to the back of its corresponding panels 3;

Figure 3, a perspective fragmentary view of one corner of the bottom section C in finished and in an intermediate stage of erection;

Figure 4, a perspective view of the bottom section C in finished condition fully erected;

Figure 5, a sectional view on the line 5—5 of Figure 4, looking in the direction of the arrows;

Figure 6, a sectional view on the line 6—6 of Figure 4, looking in the direction of the arrows;

Figure 7, a plan view of the body blank prior to final pasting;

Figure 8, a top plan view of the body section in finished condition with the bracing and spreading flanges F folded inward at right angles into operative interengaging position and with the locking tongues F extending laterally and upwardly at an inclination;

Figure 9, a top plan view of the blank from which the top section A is formed;

Figure 10, a fragmentary perspective view of a lower corner of the body section B;

Figure 11, a fragmentary sectional view, broken away, on line 11 of Fig. 1, looking in the direction of the arrows; and Figure 12, a fragmentary sectional view on the line 12—12 of Fig. 1, looking in the direction of the arrows.

Referring now in detail to the drawings, A designates the top or cover section; B, the body section; and C the lower end or bottom section, the cover A being removable from and replaceable on the upper end of the body section B and the lower end or bottom section C being, in assembled relation, locked to the lower end of the body section B so as to be inseparable therefrom without mutilation or without the use of special tools.

The body B may be formed of a suitable cardboard blank vertically scored at suitable points with fold lines and provided with an adhesive coated lap G for pasting it together in the form of a square or other suitable form body section provided at its lower end with preferably integral inwardly folding mitred end spacing and bracing flanges C and with preferably integral laterally outwardly upwardly inclined locking tongues F, all constructed, arranged and functioning as set forth and described in each of the patents herein and above referred to.

The bottom section C will be of such size as to just snugly receive between the inner faces of its lip or flange the lower end of the body section B, said lip being of such height as to extend upward along the body section B beyond the upper ends of the locking tongues F and being formed with tongue receiving sockets 9 having downwardly presented abrupt walls of faces opposed to and to be engaged by and interlock with the opposed upper end edge faces of the locking tongues F respectively as described in said above referred to patents.

The lip or flange of said bottom section C is of double panel or thickness, the panels of two sides of said lip or flange being glued or pasted together, and the inner panels of the other two sides thereof having a strip of heavy tough paper or light cardboard pasted thereto, thus being reinforced on all sides by double thickness or more of material and strengthened by the sizing and body of the glue or adhesive, with resultant resistance to any tendency to warp, curl or bend.

The lip or flange of said bottom section C is preferably formed integral with said section and of such construction that in knocked-down condition it will lie flat with the said section C so that in such knocked down condition said section C is comparable to a thick sheet of paper or a sheet of flat cardboard and may be stored, filed and shipped in stacks with the same conservation of space and facility of access. To this end each section C will be formed with two outer edge or lip or flange panels 1 opposite each other; two similar outer panels 2 opposite each other and respectively between the panels 1; two inner panels 3 respectively integral with the panels 1 and adapted to be folded over inwardly against the inner faces of the latter; two similar inner panels 4 integral with the panels 2 and adapted to be folded over inwardly against, and pasted to, the inner faces of the panels 2; four end flaps 8 integral with the respective ends of the respective panels 2 and in erected relation received and locked between the adjacent end portions of the respective panels 1 and 3; two spacing and bracing flanges 5 having their ends mitred at 45 degrees and integral with the edges of the respective panels 3; two similar spacing and bracing flanges 6 having their ends similarly formed or cut and integral with the edge portions of panels 4; and two reinforcing locking tongue confining strips 7 of heavy tough paper or light cardboard pasted against the outer faces of the panels 3 over the openings or sockets 9 therein.

Preferably adhesive, as indicated by the stippling in Fig. 2, will be applied to the outer faces of the panels 4, which are to be folded inward along a scored line a and pasted to the opposed inner faces of the panels 2. The panels 3 similarly fold inward along scored lines b to overlie the end flaps 8 and to lie against the inner faces of the respective panels 1, but are not pasted to the latter. The panels 1 and 2 fold upward at right angles to the upper face of the bottom section C along score lines c. The end flaps 8 fold inward at right angles to the panels 2 along scored lines d to lie between panels 1 and 3. The spacing and bracing flanges 5 and 6 fold along scored lines e to lie flat, and press, against the upper face of the bottom section C with their mitred end edges in interlocked spreading and bracing engagement, when the lip is erected, as illustrated in Figure 4. No adhesive is applied to the spreading and bracing flanges 5 and 6 which merely rest on and press against the upper face of the bottom section C, but may be raised or turned or swung upward from, or downward against, said face of said section, along the scored lines e respectively as hinges.

The panels 3 and 4 are formed with a plurality of openings 9 to receive the corresponding locking tongues F of the body section B, the panels 2 incident to the pasting of the panels 2 and 4 together serving to close the outer sides of these openings to form sockets 9, and the adhesive coated tough paper or cardboard strips 7 pasted to the outer faces of the panels 3 serving the same function.

With a bottom section C in flat condition, to erect the same, the panels 2, with panels 4 pasted thereto, are folded upward along scored lines c at right angles to the upper face of the bottom section C, the end flaps 8 are then folded inward at right angles to panels 2 along scored lines d, the bracing and spacing flanges 6 then lying against the upper face of the section. Thereafter panels 1 are folded upward at right angles to the upper face of the section along scored lines c, with their respective end portions in rubbing contact with the outer faces of the respective end flaps 8. The panels 3 are then folded inward and downward over the respective end flaps 8 and against the inner faces thereof and of the panels 1. Thereafter the spacing and bracing flanges 5 are pressed down against the upper face of the bottom section C with their mitred ends between and in locking bracing and spacing engagement with the adjacent opposed mitred ends of the similar flanges 6, when the erection of the bottom section C will have been completed.

The construction, operation and mode of erection of the top section A is the same as in the case of the bottom section C except that since, in the embodiment illustrated, there is no interlocking relation between the body section B and the top section A, the panels 3' and 4' will not be formed with sockets 9 and consequently the adhesive coated backing strips 7 will not be provided for the panels 3' of the top section A.

I claim:

A box end section having a plurality of lip outer panels integral with its edge portions, a plurality of lip inner panels respectively integral with the outer edge portions of said panels and adapted to be folded inward along scored lines coincident with said edge portions to lie flat against said outer panels, a plurality of spacing and bracing flanges integral with the outer edges of said inner panels and having their end edge faces formed to engage and interlock with each other, said inner panels being formed with openings, two of said inner panels on opposite sides of said section being pasted by adhesive to the inner faces of their respective cooperating panels which serve as outer walls for said openings, and end flaps extending laterally from the respective ends of the respective last mentioned outer panels, and tough backing strips pasted by adhesive to the outer faces of the remaining inner panels to serve as outer walls for the openings therein, said section lying flat prior to its erection, and said lip formed by said panels being formed at all points of at least two thicknesses of material and being capable of erection perpendicular to the face of said section with the adjacent end edge faces of said bracing and spacing flanges in interlocking engagement to maintain the lip in erected condition and of proper shape and resisting deformation thereof.

JOSEPH G. HUYE.